US009648206B2

(12) United States Patent
Jittou

(10) Patent No.: US 9,648,206 B2
(45) Date of Patent: May 9, 2017

(54) IMAGE PROCESSING APPARATUS, IMAGE PROCESSING METHOD AND COMPUTER PROGRAM

(71) Applicant: CANON DENSHI KABUSHIKI KAISHA, Chichibu-shi, Saitama (JP)

(72) Inventor: Toshifumi Jittou, Chichibu (JP)

(73) Assignee: CANON DENSHI KABUSHIKI KAISHA, Chichibu-Shi, Saitama-Ken (JP)

( * ) Notice: Subject to any disclaimer, the term of this patent is extended or adjusted under 35 U.S.C. 154(b) by 0 days.

(21) Appl. No.: 14/043,594

(22) Filed: Oct. 1, 2013

(65) Prior Publication Data
US 2014/0029064 A1 Jan. 30, 2014

Related U.S. Application Data

(63) Continuation of application No. PCT/JP2012/002311, filed on Apr. 3, 2012.

(30) Foreign Application Priority Data

Apr. 13, 2011 (JP) ................. 2011-089519

(51) Int. Cl.
H04N 1/40 (2006.01)
H04N 1/387 (2006.01)
H04N 1/23 (2006.01)

(52) U.S. Cl.
CPC .......... H04N 1/3877 (2013.01); H04N 1/233 (2013.01); H04N 1/2323 (2013.01)

(58) Field of Classification Search
None
See application file for complete search history.

(56) References Cited

U.S. PATENT DOCUMENTS 5,508,810 A 4/1996 Sato .............................. 358/296
5,960,229 A 9/1999 Fukuoka
(Continued)

FOREIGN PATENT DOCUMENTS

CN 1164053 11/1997
CN 1186290 7/1998
(Continued)

OTHER PUBLICATIONS

International Search Report (translation) dated May 22, 2012 in counterpart international application No. PCT/JP2012/02311.
(Continued)

Primary Examiner — Vincent Rudolph
Assistant Examiner — Michael Burleson
(74) Attorney, Agent, or Firm — Fitzpatrick, Cella, Harper & Scinto

(57) ABSTRACT

An output image having high visibility for a user is obtained. An effective image region for an image is designated. Whether a direction of the image is visually an upper or lower direction is detected. A header of a source document region in the image is detected. When the direction of the image is the upper direction, the effective image region is output as an output image with reference to the header of the source document region. When the direction of the image is the lower direction, the image is rotated, and the effective image region is output as an output image with reference to the header of the source document region.

13 Claims, 14 Drawing Sheets

(56) References Cited

U.S. PATENT DOCUMENTS

| | | | |
|---|---|---|---|
| 7,751,099 B2 | 7/2010 | Mizuhashi | |
| 8,270,041 B2 | 9/2012 | Fujiwara | |
| 8,422,076 B2* | 4/2013 | Toda | 358/1.9 |
| 2005/0073727 A1 | 4/2005 | Park | |
| 2005/0162680 A1* | 7/2005 | Sekiguchi et al. | 358/1.13 |
| 2005/0231745 A1* | 10/2005 | Kawai et al. | 358/1.12 |
| 2007/0058189 A1* | 3/2007 | Yaguchi | 358/1.13 |
| 2009/0097071 A1* | 4/2009 | Tsukuba | G06K 15/021 358/1.18 |
| 2011/0158712 A1* | 6/2011 | Yacoub | G03G 15/0131 399/302 |
| 2011/0249905 A1* | 10/2011 | Singh et al. | 382/225 |

FOREIGN PATENT DOCUMENTS

| | | |
|---|---|---|
| CN | 1605948 | 4/2005 |
| CN | 1625207 | 6/2005 |
| CN | 101409762 | 4/2009 |
| JP | 2001-251494 | 9/2001 |
| JP | 2002-281291 | 9/2002 |
| JP | 2006-157784 | 6/2006 |
| JP | 2007-206939 | 8/2007 |

OTHER PUBLICATIONS

Extended European Search Report dated Oct. 20, 2014, in counterpart European Patent Application No. 12772054.8.
Chinese Office Action dated Feb. 17, 2015 in counterpart Chinese Patent Application No. 201280018235.2, with partial English translation.
Zhang, Junliang, "Computer Peripheral Equipment", Tsinghua University, p. 38, Feb. 2005 (with partial English translation).

* cited by examiner

IMAGE PROCESSING APPARATUS, IMAGE PROCESSING METHOD AND COMPUTER PROGRAM

This application is a continuation of International Patent Application No. PCT/JP2012/002311 filed on Apr. 3, 2012, and claims priority to Japanese Patent Application No. 2011-089519 filed on Apr. 13, 2011, which is incorporated by reference herein in its entirety.

BACKGROUND OF THE INVENTION

Field of the Invention

The present invention relates to an image processing apparatus such as an image reading apparatus.

Description of the Related Art

In general, an image reading apparatus includes an ADF (Auto Document Feeder) which automatically feeds source documents set on a document table in turn one by one to its reading position. The ADF automatically feeds source documents one by one from a feed port. The image reading apparatus (to be referred to as a scanner hereinafter) optically reads a source document line by line using a line image sensor, and outputs the read document as image data. At an upper end of an output image, an image of a line which is read first is allocated. An image of the next read line is allocated at a second position from the upper end. In this manner, respective line images are allocated in the order they are read in turn from the upper end of the output image. For this reason, as the output image from the scanner, a different image is formed depending on whether the upper or lower end of a source document is directed to the feed port. For example, when the upper end of a source document is directed to the feed port (to be referred to as "reading a source document from the upper end" hereinafter), the upper end of the source document is allocated at the upper end of an image to be output. On the other hand, when the lower end of a source document is directed to the feed port (to be referred to as "reading a source document from the lower end" hereinafter), the lower end of the source document is allocated at the upper end of an image to be output. Therefore, an output image obtained when the source document is read from the lower end is an image obtained by rotating, through 180°, an output image obtained when the source document is read from the upper end.

However, when a different output image is formed depending on a set direction of a source document, the visibility of the image drops. For example, in case of a source document on which characters are written, it is difficult for the user to read characters from a 180°-rotated output image. In order to prevent such visibility drop, PTL 1 has proposed a technique which aligns directions of a plurality of output images by rotating an output image through 180° when source documents are set to be vertically flipped.

PLT 1: Japanese Patent Laid-Open No. 2001-251494

SUMMARY OF THE INVENTION

For the scanner, the user may designate a length of an output image. When the scanner detects that the length of an output image designated by the user is larger than that of a source document, it shapes an output image by adding a margin so as to attain the length designated by the user.

FIG. 1 shows two cases. In a first case, a1 indicates a length of an output image designated by the user (designated length). a2 indicates that the length of a source document (actual length) is smaller than the designated length. a3 indicates an output image by adding a margin having a length corresponding to a difference between the designated length and actual length to the lower end of the image. In a second case in FIG. 1, b1 indicates a designated length of an output image designated by the user. b2 indicates an actual length of a source document. b3 indicates an output image which is output by reading the source document only by the designated length without reading the remaining part.

When a length adjustment function of an output image is combined with the invention described in Japanese Patent Laid-Open No. 2001-251494, a different output image is formed depending on whether a source document is conveyed from the upper or lower end. The reason why a different output image is formed will be described below with reference to FIG. 2. In FIG. 2, c1 indicates a source document shorter than the designated length. c2 indicates an output image obtained when the source document is read from the upper end. In this output image c2, line images are allocated in an order of the upper end of the source document, a document region, the lower end of the source document, and a margin. c3 indicates an image obtained by rotating, through 180°, an output image obtained when the source document is read from the lower end. On the output image obtained when the source document is read from the lower end, line images are allocated in an order of the lower end of the source document, a document region, the upper end of the source document, and a margin, and the entire output image is then rotated through 180°. Therefore, the finally obtained output image unwantedly becomes an image on which line images are allocated in an order of the margin, the upper end of the source document, the document region, and the lower end of the source document. That is, the output image c2 obtained when the source document is read from the upper end does not match the output image c3 obtained when the source document is read from the lower end. The same problem is posed even in a case in which the designated length is smaller than the actual length. In FIG. 2, d1 indicates an actual length of a source document. d2 indicates an output image obtained when the source document is read from the upper end. On the output image d2, line images are allocated in the order of the upper end of the source document and document region. By contrast, d3 indicates an output image obtained when the source document is read from the lower end. The output image d3 is rotated through 180° after line images are allocated in an order of the lower end of the source document and document region. In this manner, the output image d2 obtained when the source document is read from the upper end does not match the output image d3 obtained when source document is read from the lower end.

As a method of solving such problem, the user manually aligns the upper and lower ends of all source documents, and then sets these source documents to be read by the scanner. With this method, even when the designated length and actual length do not match, output images having high visibility for the user can be obtained. However, the workload on the part of the user increases.

Hence, the present invention facilitates to obtain output images having high visibility for the user without increasing the workload on the part of the user which is required to align the upper and lower directions or right and left directions of source documents even when the designated length and actual length do not match.

The present invention provides an image processing apparatus comprising:

an image input unit configure to input an image of a source document;

a direction detection unit configure to detect a direction of the image;

an image region detection unit configure to detect a header of a specific region of the image;

an effective image region designation unit configure to designate an effective image region for the image; and an image processing unit configure to, when the effective image region is output as an output image based on the header of the specific region detected by the image region detection unit, and when the direction of the image is not a predetermined direction, process the image to have the predetermined direction.

Other features and advantages of the present invention will become apparent from the following description with reference to the accompanying drawings. Note that the same reference numerals denote the same or similar components throughout the accompanying drawings.

BRIEF DESCRIPTION OF THE DRAWINGS

The accompanying drawings are included in the specification, constitute a part of the specification, and are used to describe embodiments of the present invention and to explain the principle of the present invention together with its description.

DESCRIPTION OF THE EMBODIMENTS

First Embodiment

Figure 1:
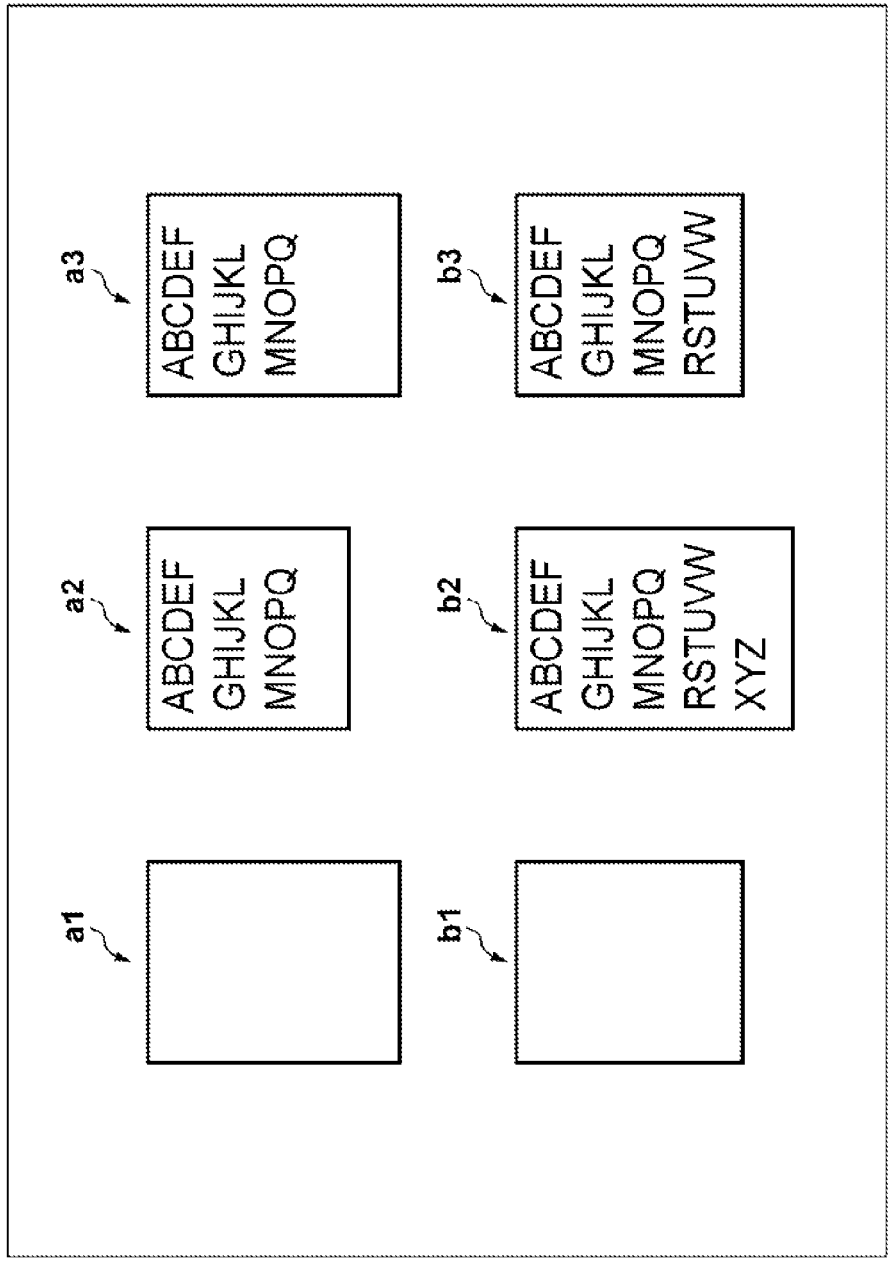
FIG. 1 is a view showing examples of output images.
Figure 2:
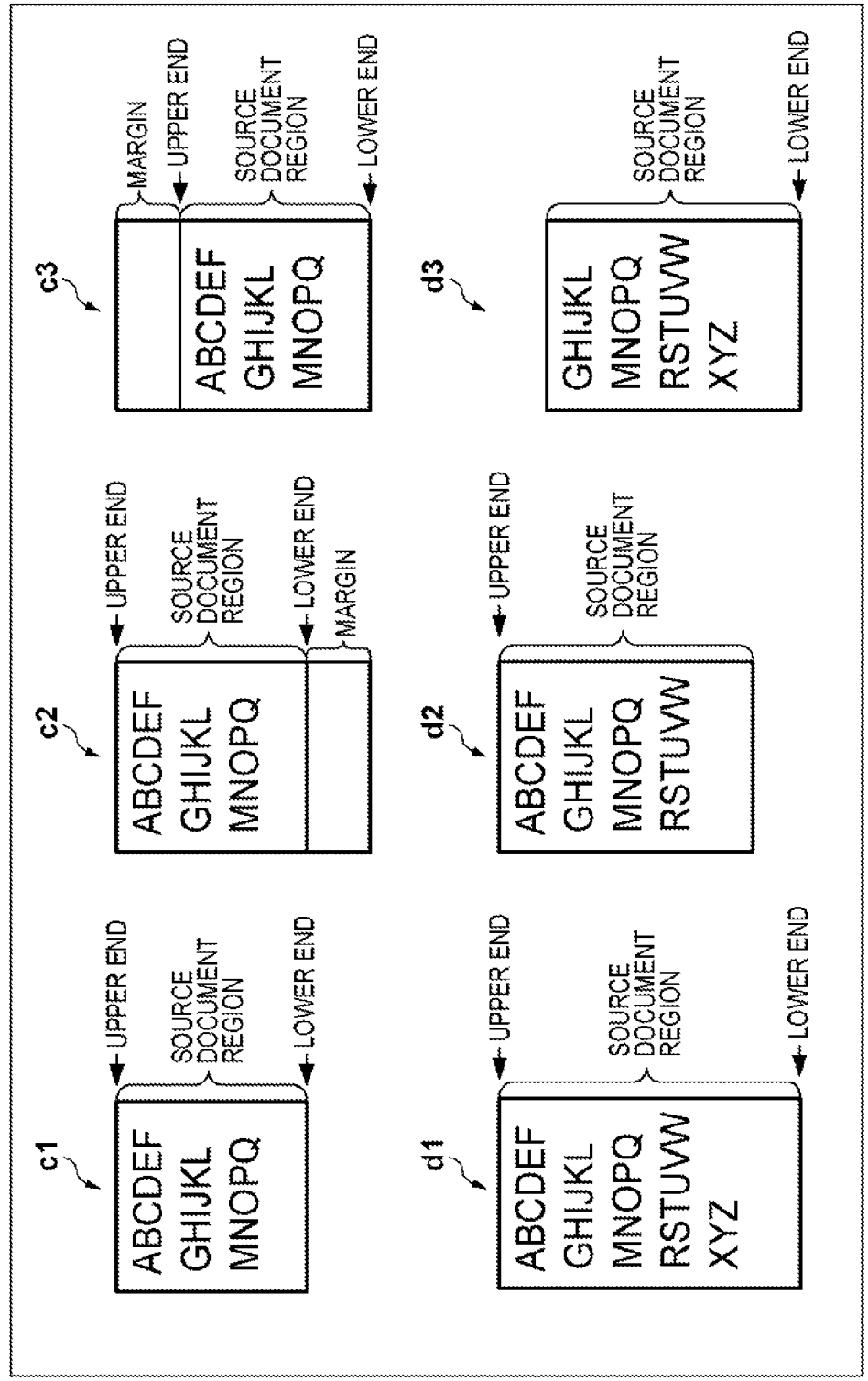
FIG. 2 is a view showing examples of output images corresponding to different feed directions in a comparative example.
Figure 3:
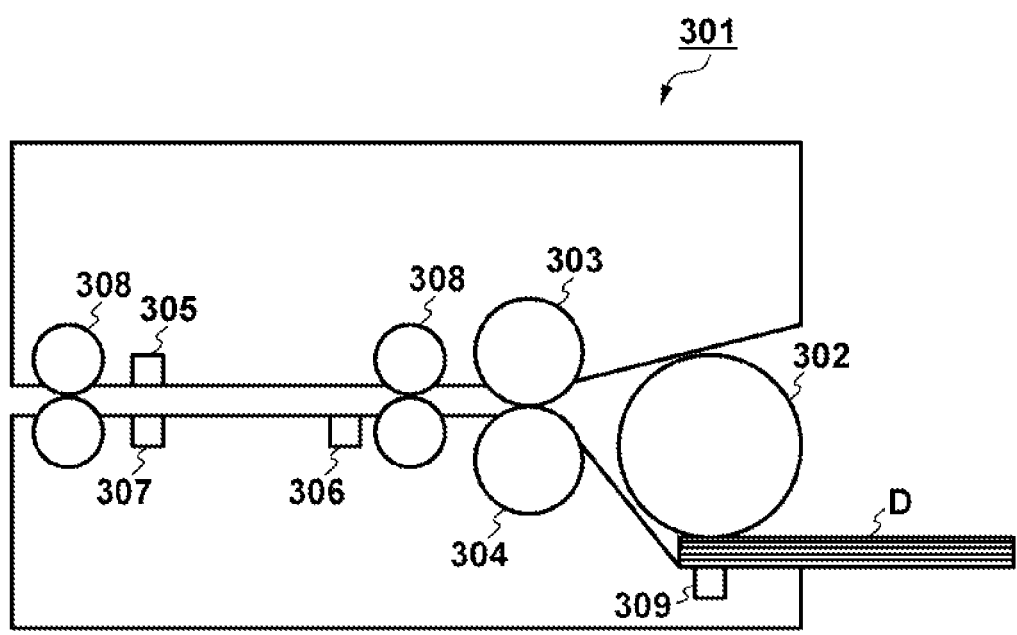
FIG. 3 is a sectional view showing the arrangement of a scanner.

FIG. 3 is a view showing the arrangement of a scanner according to the present invention. A scanner 301 is an example of an image reading apparatus, which separates and feeds a plurality of source documents one by one, and reads an image on the fed source document. A pickup roller 302 picks up a source document bundle D, the upper or lower end of which is directed to a feed port. A feed roller 303 feeds the source document bundle D picked up by the pickup roller 302 along a conveyance path. A separation roller 304 separates the picked-up source document bundle D one by one. A plurality of conveyance rollers 308 conveys the fed source document to a discharge port. A line image sensor 305 reads image information on an upper face of the source document. The line image sensor 305 is an example of image input means for inputting an image on a source document, and reads one line including pixels arrayed in a main scanning direction (a direction perpendicular to a document conveyance direction). A sub-scan is attained when the conveyance rollers 308 convey the source document. A facing surface 307 is a white reference plate arranged at a facing position of the line image sensor 305. A registration sensor 306 is a sensor which detects the source document conveyed along the conveyance path. A document detection sensor 309 is a sensor which detects source documents set at the feed port.

Note that this embodiment includes, as the line image sensor 305, a one-line image sensor, red light source, green light source, and blue light source. These light sources light in an order of red, green, and blue. However, the line image sensor is not limited to this. For example, an image sensor having a different lighting order of green, blue, and red of light sources may be used, or an image sensor having three line sensors respectively including red, green, and blue color filters and a white light source may be used. After the image is read, the source document is discharged outside the scanner 301.

Figure 4A:
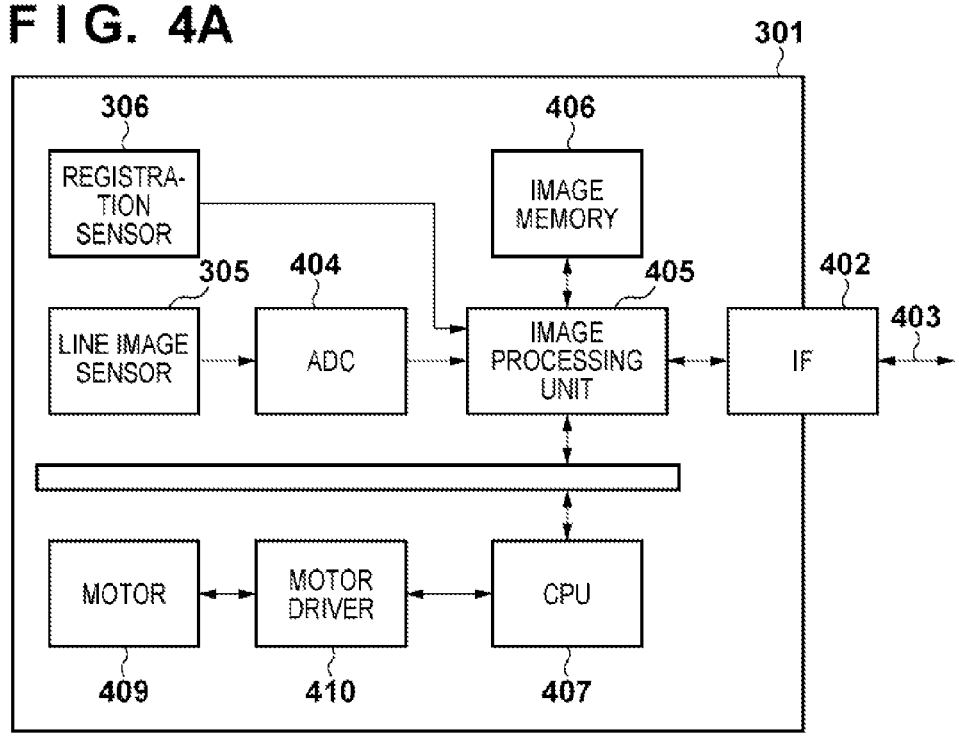
FIG. 4A is a block diagram showing electrical hardware of the scanner.

FIG. 4A is a block diagram showing electrical hardware of the scanner 301. An interface unit 402 is a communication unit required to communicate with a host apparatus such as a personal computer. The interface unit 402 is connected to the host apparatus via a signal cable 403. An A/D conversion unit (ADC) 404 is a unit which amplifies an output signal of the line image sensor 305, applies analog processing such as black level clamping to the amplified signal, and finally converts the processed signal into digital data (image data). An image processing unit 405 controls the line image sensor 305, A/D conversion unit 404, and the like, and applies various image processes to image data. The image processes to be executed by the image processing unit 405 include, for example, processing for determining whether the source document is fed from the upper or lower end, 180° rotation processing of an image, processing for detecting the upper end of the source document from an image, and image correction processing based on the lighting order of the light sources of the line image sensor 305. Note that all or some of these processes may be executed by a driver of the host apparatus. An image memory 406 is a storage device which stores image data. A CPU 407 is a control unit which systematically controls the respective units included in the scanner 301. The image processing unit 405 and CPU 407 are connected via a bus 408. The CPU 407 can access the image memory 406 via the image processing unit 405. A motor 409 is a driving unit which drives the respective rollers required to convey the source document. A motor driver 410 drives the motor 409 in accordance with an instruction from the CPU 407.

Figure 4B:
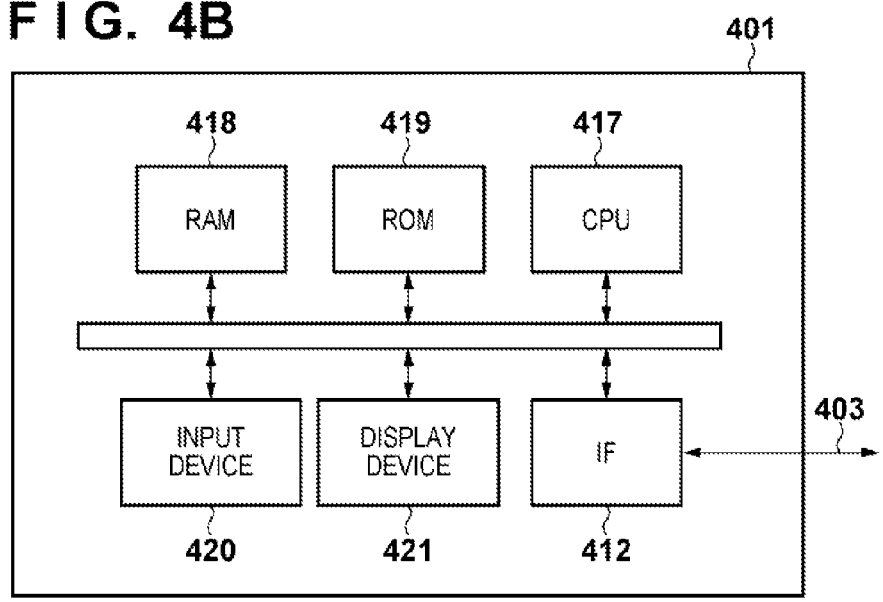
FIG. 4B is a block diagram showing electrical hardware of a host apparatus.

FIG. 4B is a block diagram showing electrical hardware of a host apparatus 401. The host apparatus 401 is an information processing apparatus such as a personal computer. An interface unit 412 is a communication unit which communicates with the scanner 301 via the signal cable 403.

The interface unit 412 functions as image input means for inputting an image of a source document since it receives image data transmitted from the scanner 301. That is, the interface unit 412 functions as a reception means for receiving an image transmitted from the image reading apparatus which separates and feeds a plurality of source documents one by one, and reads an image on the fed source document. A CPU 417 is a control unit which systematically controls the respective units included in the host apparatus 401. A ROM 419 is a storage device which stores application software, driver software, an operating system, and the like, and includes a mask ROM, EEPROM, hard disk drive, or the like. A RAM 418 is a volatile memory which functions as a work area of the CPU 417. An input device 420 includes a keyboard, pointing device, and the like, and is a device used by an operator such as the user to input information. A display device 421 is a device which outputs information to the operator.

Figure 5:
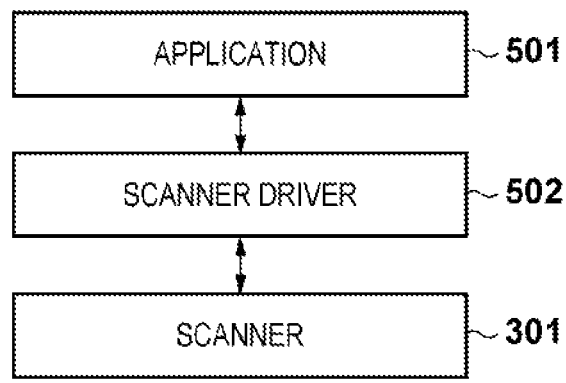
FIG. 5 is a view showing the relationship between an application and driver, which run on the host apparatus, and the scanner.

FIG. 5 is a view showing the relationship between the application and driver which run on the host apparatus 401, and the scanner 301. The user installs computer programs such as an application 501 and driver 502 in the host apparatus 401 in advance. When the CPU 417 launches the application 501, it communicates with the scanner 301 via the driver 502. The application 501 communicates with the driver 502 using a predetermined protocol. In this embodiment, the application 501 and driver 502 communicate with each other by a protocol specified by the Twain standard, and the driver 502 and scanner 301 communicate with each other by a protocol specified by the SCSI standard. However, the protocols used are not limited to these specific protocols. For example, a communication standard between the application 501 and driver 502 may be ISIS or WIA. Also, a communication standard between the driver 502 and scanner 301 may be USB or Bluetooth.

Figure 6:
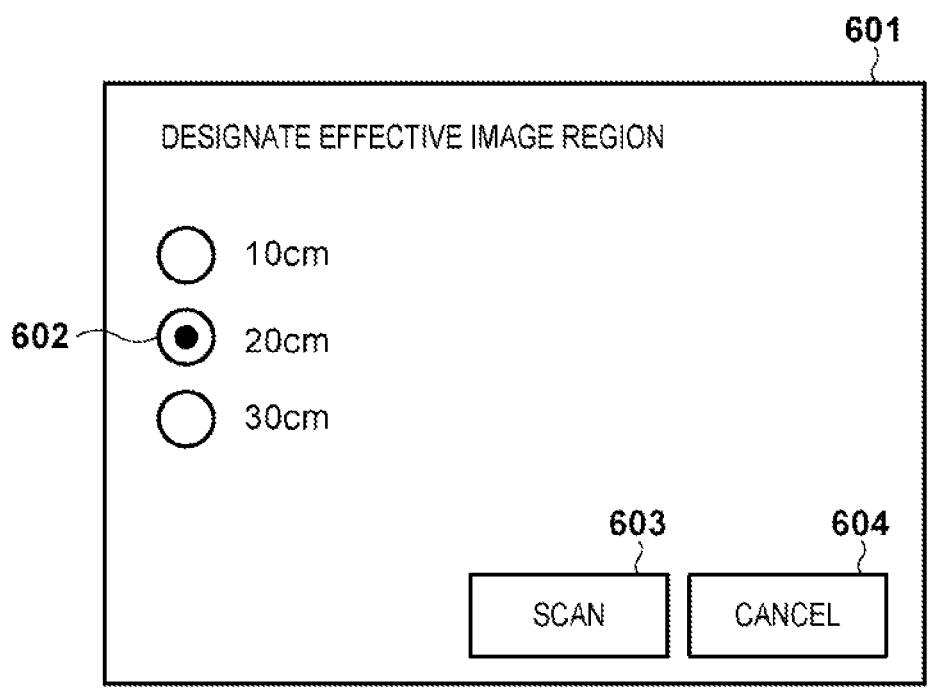
FIG. 6 is a view showing an example of a user interface.

FIG. 6 is a view showing a user interface which is displayed by the CPU 417 on the display device 421 according to the application 501. A user interface 601 includes radio buttons 602 used to designate an effective image region to be output as an output image of an input image, a scan button 603 used to input a reading start instruction, and a cancel button 604 used to input a reading cancel instruction. In this example, an effective image region can be designated by a length (designated length) in the sub-scanning direction of an image. The length in the main scanning direction of the effective image region may assume a fixed value, or may be dynamically determined. More specifically, the designated length of the effective image region may be selected according to a standard size (A4) of a source document, it may be arbitrarily input and designated by the user, or an arbitrary or fixed length (positive/negative value) with respect to a predetermined length may be additionally designated. In this case, the length in the main scanning direction of a source document is recognized from an input image by contrast detection, and the recognized length is adopted as that in the main scanning direction of the effective image region. Alternatively, the length in the main scanning direction of the effective image region may be designated by the operator via the input device 420. In this manner, the effective image region is a region defined by the length in an up-and-down direction of an output image.

In FIG. 6, the operator operates a mouse as the input device 420 connected to the host apparatus 401 to operate each radio button 602 and a check box on the user interface 601. In this example, when one of "10 cm", "20 cm", and "30 cm" is selected as the designated length, and pressing of the scan button 603 is detected, the CPU 417 controls the scanner 301 to start reading of an image corresponding to the designated length. The CPU 417 functions as effective image designation means for designating an effective image region for an image. Upon detection of pressing of the cancel button 604 on the user interface 601, the CPU 417 closes the user interface 601. The description of this embodiment will be given under the assumption that a reading condition is designated using the mouse connected to the host apparatus 401. Alternatively, the reading condition may be designated using a touch panel connected to the scanner 301.

Figure 7:
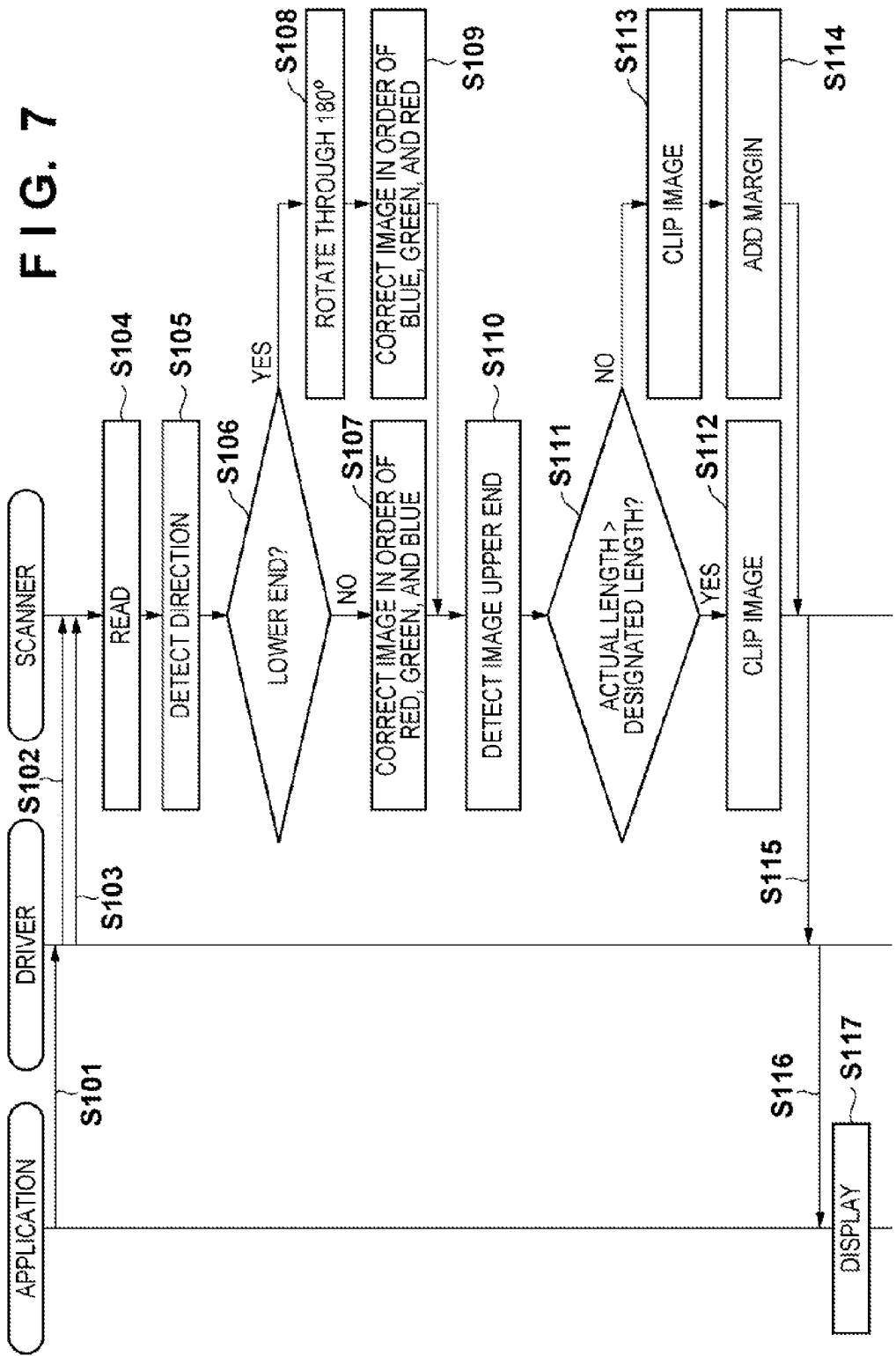
FIG. 7 is a flowchart showing image reading processing according to the first embodiment.

FIG. 7 is a flowchart showing image reading processing. When the operator selects the desired designated length of an image and presses the scan button 603 on the user interface 601 in step S101, the CPU 417 generates an image reading start instruction according to the application 501, and transmits the instruction to the driver 502.

In step S102, the CPU 417 receives an image reading start instruction, generates a reading setting, and transmits the reading setting to the scanner 301 according to the driver 502. In step S103, the CPU 417 transmits the image reading start instruction to the scanner 301 according to the driver 502.

In step S104, the image processing unit 405 of the scanner 301 receives the reading setting and image reading start instruction from the driver 502 of the host apparatus 401, and controls the image sensor 305 and motor 409 to read an entire image of a source document. The image processing unit 405 generates an image including the entire source document.

In step S105, the image processing unit 405 of the scanner 301 detects a feed direction of the source document. That is, the image processing unit 405 detects whether a direction of the image is a visually upper or lower direction. For example, the image processing unit 405 executes determination processing for analyzing the read image (input image), and determining whether the source document is fed from either the upper or lower end. Since this embodiment is the invention which does not depend on the determination processing of the conveyance direction, arbitrary determination processing can be adopted. An upper direction of the input image matches an upper end direction of a source document, and a lower direction of the input image matches a lower end direction of the source document. Thus, for example, the image processing unit 405 may execute character recognition processing, and may settle a visually upper direction of characters as the upper end direction of the source document. Alternatively, the image processing unit 405 may detect punch holes from an image, and when the detected punch holes are arranged on the left side of the source document, it may determine that the source document is fed from the upper end; when the punch holes are arranged in other directions, it may determine that the source document is fed from the lower end. In place of determination of the conveyance direction from an image, the conveyance direction may be determined using a sensor included in the scanner 301 like in the technique described in Japanese Patent Laid-Open No. 2001-251494. In this manner, the image processing unit 405 functions as a direction detection means. Furthermore, the image processing unit 405 functions as a direction detection means for recognizing characters included in an image, and determining based on directions or a recognition rate of the recognized characters whether a direction of an image is a visually upper or lower direction, for recognizing positions of punch holes formed in a source document from an image, and determining based on the positions of the punch holes whether a direction of an image is a visually upper or lower direction, or for determining based on information input by an operator whether a direction of an image is a visually upper or lower direction. According to this embodiment, even when source documents have different directions depending on states of source documents directed to the feed port of the scanner 301, since directions of respective source document images can be specified, processing for uniformly aligning directions of output images or upper ends of output images based on the directions of the source document images can be executed. Thus, even when source documents are set to have various directions with respect to the feed port, output states of output images can be uniformly aligned according to the directions of the source documents. Note that such processing may be executed for each source document or batch processing may be executed after a plurality of source documents are read together.

The image processing unit 405 determines in step S106 whether or not the determination result indicates that the source document is fed from the lower end. If the source document is fed from the lower end, the process advances to step S108; if the source document is fed from the upper end, the process advances to step S107.

In step S107, since the source document is fed from the upper end, the image processing unit 405 executes image correction processing based on the lighting order of the light sources of the line image sensor 305. In this embodiment, the image processing unit 405 executes the image correction processing based on the lighting order of red, green, and blue. However, the image correction processing based on the lighting order of the light sources is correction processing in which, for example, when the image processing unit 405 scans an image from the upper end and finds an array of white, red, and black pixels, it converts the array into that of white, black, and black pixels; when the image processing unit 405 finds an array of black, blue, and white pixels, it converts the array to that of black, white, and white. Note that the reason why an image is corrected by this processing is as follows. In source document reading using the image sensor including the three light sources which light in the order of red, green, and blue, and one line sensor, only the red light source is lighted and its reflected light is read by the image sensor, only the green light source is lighted and its reflected light is read by the image sensor, only the blue light source is lighted and its reflected light is read by the image sensor, and these read image data are superposed, thereby generating an image for one line. However, since the source document is conveyed even during an interval in which the light sources are repetitively lighted and lighted off, a portion of the source document read when a certain light source is lighted and that of the source document read when another light source is lighted have a slight difference. For this reason, when a black line in a white source document is read, the line has a red upper portion and blue lower portion. Therefore, when the red upper portion and blue lower portion of the black line are respectively changed to black and white, the line of the source document can be reconstructed.

If the source document is fed from the lower end, the image processing unit 405 rotates the input image through 180° in step S108. In step S109, the image processing unit 405 executes the image correction processing based on the lighting order of the light sources of the line image sensor. However, since the image is rotated through 180°, the image processing unit 405 executes image correction processing based on a lighting order of blue, green, and red as the inverted lighting order. For example, when the image processing unit 405 scans an image from the upper end, and finds an array of white, blue, and black pixels, it converts the array into that of white, black, and black pixels; when the image processing unit 405 finds an array of black, red, and white pixels, it converts the array into that of black, white, and white.

In step S110, the image processing unit 405 detects an upper end of a specific region in the read image. More specifically, the image processing unit 405 detects where the upper end of the source document (a header of a source document region) or the upper end of the image is located in the image. In general, since the size of the read image is larger than that of the source document, the read image includes a contour of the source document. Hence, the upper end of the source document can be detected. Assume that the position of the source document upper end is detected using the registration sensor 306 in this embodiment. The image processing unit 405 calculates time t' at which the source document upper end reaches the line image sensor 305 based on time t at which the source document upper end has passed the registration sensor 306, a distance l between the registration sensor 306 and line image sensor 305, and a source document conveyance velocity v.

$$t'=t+l/v$$

Furthermore, the image processing unit 405 judges a line read at the calculated time t' as that of the source document upper end. However, as the detection method of the position of the source document upper end, methods other than that in this embodiment may be used. For example, a method of detecting a shadow of the source document from an image may be used. Likewise, the image processing unit 405 detects the lower end of the image. In this manner, the image processing unit 405 functions as an image region detection means for detecting the header of a specific region in an image (for example, detecting the header of a source document region corresponding to a source document in an input image). That is, the image processing unit 405 functions as an image region detection means for detecting the upper end of a source document as the header of a source document region as a specific region. In this case, the specific region of the image may be an actually read image region or an actual source document region included in the read image region.

If the image processing unit 405 determines in step S111 that a length (actual length) from the position of the source document upper end to the lower end of the image is larger than the designated length in the reading setting received from the driver 502, the process advances to step S112. In step S112, the image processing unit 405 specifies an image from the position of the source document upper end to a position corresponding to the designated length of the input image as an effective image (it clips the effective image in this embodiment). On the other hand, if the actual length is not larger than the designated length, the process advances to step S113. In step S113, the image processing unit 405 clips an image corresponding to that from the position of the source document upper end to a position of the source document lower end from the input image. In step S114, the image processing unit 405 adds a margin corresponding to a difference between the designated length and actual length to the lower end of the image. In this case, a margin is added to an image by reading the facing surface 307, that is, a background (a white background in this embodiment) continuously with reading of an actual source document region by the line image sensor 305. Of course, after the line image sensor 305 reads the actual source document region, margin data may be composited to that source document image data. Note that such processing for adding a margin to an image is executed in the scanner 301 in this embodiment, but it may be executed on the PC side (driver side) which controls the scanner 301. In step S115, the image processing unit 405 transfers the generated image to the driver 502.

In step S116, the CPU 417 transfers the received image to the application 501 according to the driver 502. In step S117, the CPU 417 displays the received image on the display device 421 according to the application 501.

According to this embodiment, the image processing unit 405 functions as an image processing means for, when the direction of an image is the upper direction, generating an output image with reference to the header of a specific region of the image (the header of a source document region in this case) detected by the image region detection means, and for, when the direction of an image is the lower direction, rotating the image through 180°, and generating an output image with reference to the header of the source document region. Therefore, even when the designated length of an output image designated by the operator does not match the actual length of a source document, an output image having high visibility for the user can be obtained. Also, since the need for a work of the operator required to align upper and lower directions of source documents is required, the workload on the part of the operator can be reduced.

Second Embodiment

In the description of the first embodiment, an image processing unit 405 detects a feed direction (a visual direction of an input image). The description of the second embodiment will be given under the assumption that an operator designates a feed direction in advance. Note that in the second embodiment, a description about items common to the first embodiment will not be repeated for the sake of simplicity.

Figure 8:
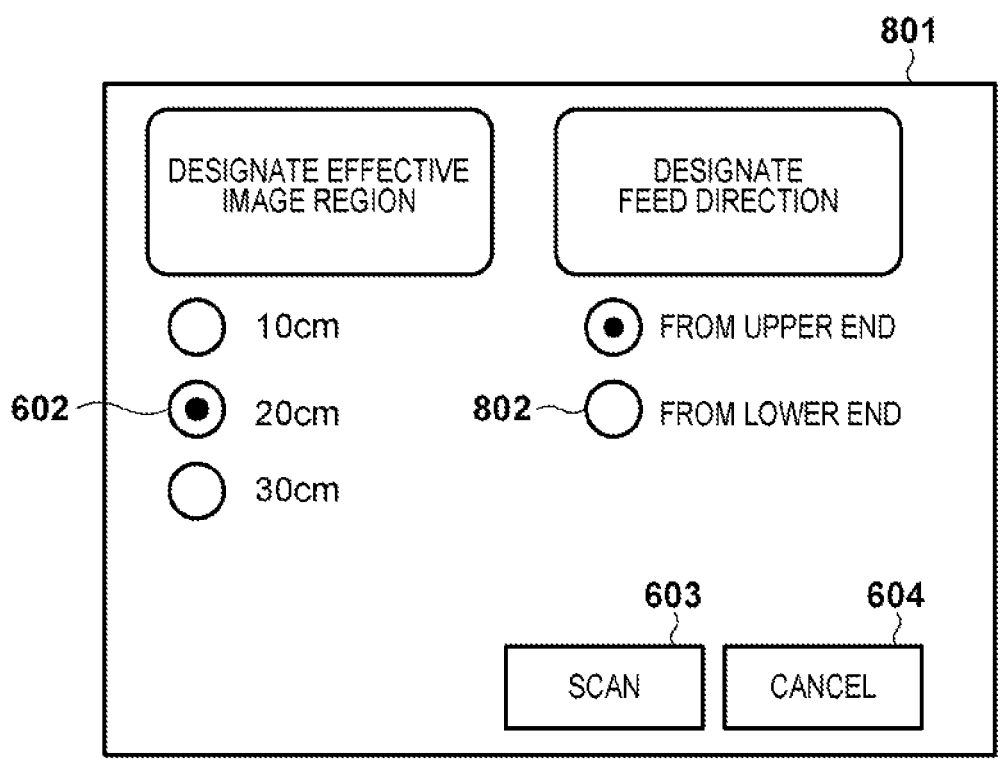
FIG. 8 is a view showing an example of a user interface.

FIG. 8 is a view showing a user interface displayed according to an application 501 according to this embodiment. Compared to the user interface 601 shown in FIG. 6, radio buttons 802 used to designate a feed direction of a source document are added to a user interface 801. The operator designates either the upper or lower end as a feed direction by operating an input device 420.

Figure 9:
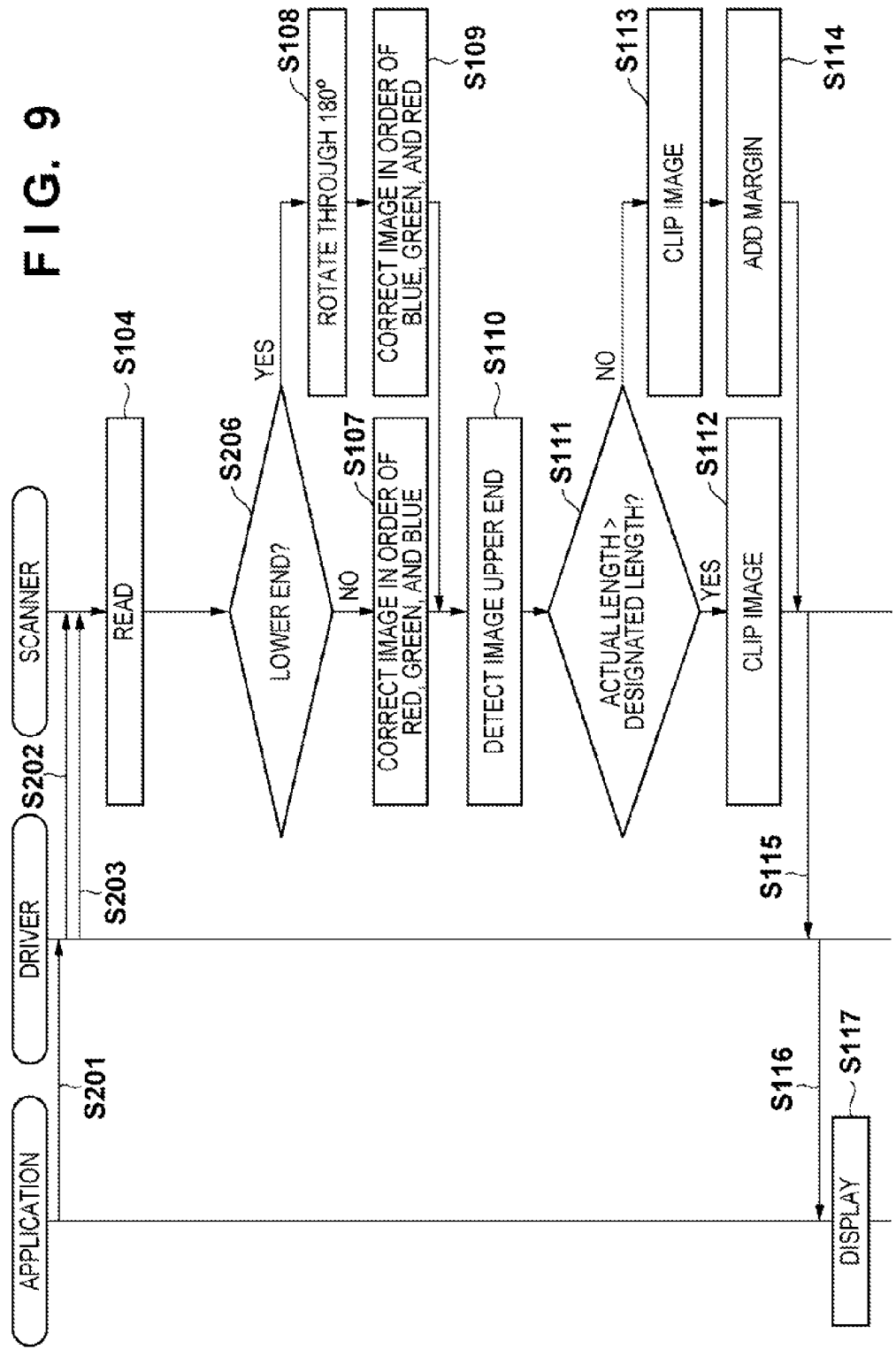
FIG. 9 is a flowchart showing image reading processing according to the second embodiment.

FIG. 9 is a flowchart showing image reading processing. When the operator selects a desired designated length and feed direction of an image and presses a scan button 603 on the user interface 801 in step S201, a CPU 417 generates an image reading start instruction, and transmits that instruction to a driver 502 according to the application 501.

In step S202, the CPU 417 receives an image reading start instruction, generates a reading setting, and transmits the reading setting to a scanner 301 according to the driver 502. In step S203, the CPU 417 transmits the image reading start instruction to the scanner 301 according to the driver 502.

In step S204, the image processing unit 405 of the scanner 301 receives the reading setting and image reading start instruction from the driver 502 of a host apparatus 401, and controls an image sensor 305 and motor 409 to read an entire image of a source document. The image processing unit 405 generates an image including the entire source document.

The image processing unit 405 determines in step S206 whether or not the feed direction designated in the reading setting indicates that the source document is fed from the lower end. If the source document is fed from the lower end, the process advances to step S108; if the source document is fed from the upper end, the process advances to step S107.

Since the subsequent processes are common to the first embodiment, a description thereof will not be repeated.

According to this embodiment, although the operator has to align the upper ends of source documents, since the need for an upper end detection mechanism can be obviated, this embodiment is advantageous in terms of manufacturing cost. Other effects are the same as those described in the first embodiment.

Third Embodiment

In the first embodiment, most of image processes are executed by the scanner 301. However, the third embodiment is characterized in that a driver 502 executes most of image processes. Note that in the third embodiment, a description about items common to the first embodiment will not be repeated for the sake of simplicity. After completion of steps S101 to S105, the process advances to step S301. Note that processes in step S306 and subsequent steps correspond to those in step S106 and subsequent steps, and an execution main body is merely changed from the image processing unit 405 to a CPU 417.

Figure 10:
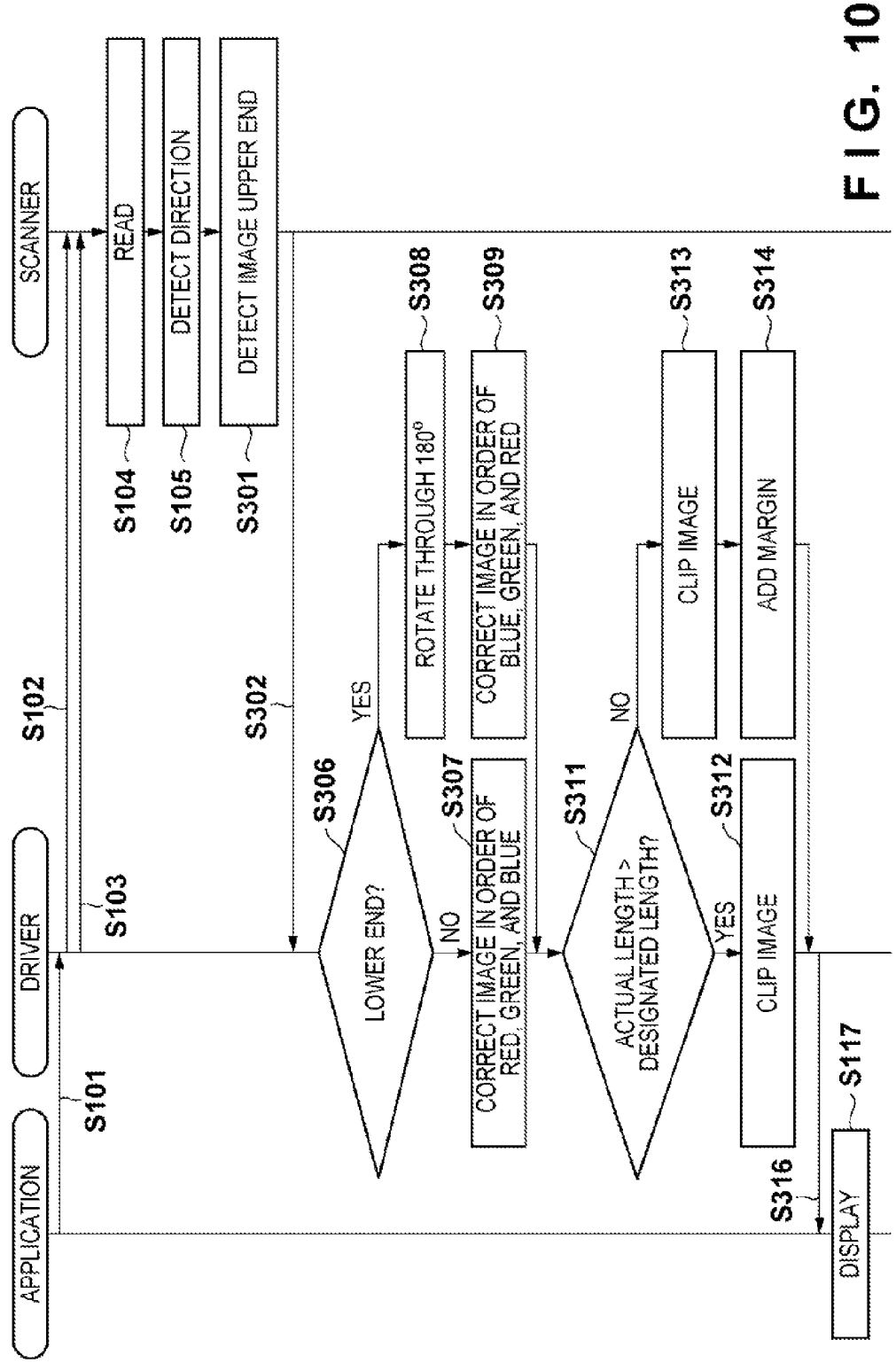
FIG. 10 is a flowchart showing image reading processing according to the third embodiment.

FIG. 10 is a flowchart showing image reading processing according to the third embodiment. In step S301, the image processing unit 405 detects the upper end (header) of a source document in an image. This processing corresponds to step S110 described above.

In step S302, the image processing unit 405 transfers the input image, and transmits the direction detection result and upper end detection result to the driver 502. The CPU 417 receives the input image, direction detection result, and upper end detection result, and stores them in a RAM 418 according to the driver 502.

The CPU 417 determines in step S306 according to the driver 502 whether or not the source document is fed from the lower end. The CPU 417 executes this determination processing based on the direction detection result. If the source document is fed from the lower end, the process advances to step S308; if the source document is fed from the upper end, the process advances to step S307.

In step S307, since the source document is fed from the upper end, the CPU 417 executes image correction processing based on a lighting order of light sources of a line image sensor 305. If the source document is fed from the lower end, the CPU 417 rotates the received input image through 180° in step S308. In step S309, the CPU 417 executes the image correction processing based on the lighting order of the light sources of the line image sensor 305.

The CPU 417 determines in step S311 whether or not an actual length is larger than a designated length. If the actual length is larger than the designated length, the process advances to step S312. In step S312, the CPU 417 clips, based on the upper end detection result, an image from a position of a source document upper end to a position corresponding to the designated length of the input image as an effective image. On the other hand, if the actual length is not larger than the designated length, the process advances to step S313. In step S313, the CPU 417 clips, based on the upper end detection result, an image corresponding to that from the position of the source document upper end to a source document lower end from the input image. In step S314, the image processing unit 405 adds a margin corresponding to a difference between the designated length and actual length to the lower end of the image. In step S316, the CPU 417 transfers the received image to the application 501 according to the driver 502. In step S117, the CPU 417 displays the received image on a display device 421 according to the application 501.

In this way, in the third embodiment, the CPU 417 functions as the aforementioned image processing means. In the third embodiment, even when the driver 502 executes some of image processes, the same effects as in the first embodiment can be provided. Especially, since the CPU 417 of the host apparatus 401 assumes to execute the processes, those of the scanner 301 can be reduced. That is, since the processing performance required for the scanner 301 can be lowered, the scanner 301 can be easily manufactured at lower cost. Other effects are the same as those described in the first embodiment.

Fourth Embodiment

The fourth embodiment is the invention as a combination of the second and third embodiments. Feed direction designation processing of the second embodiment and image processes by a driver 502 of the third embodiment are combined.

Figure 11:
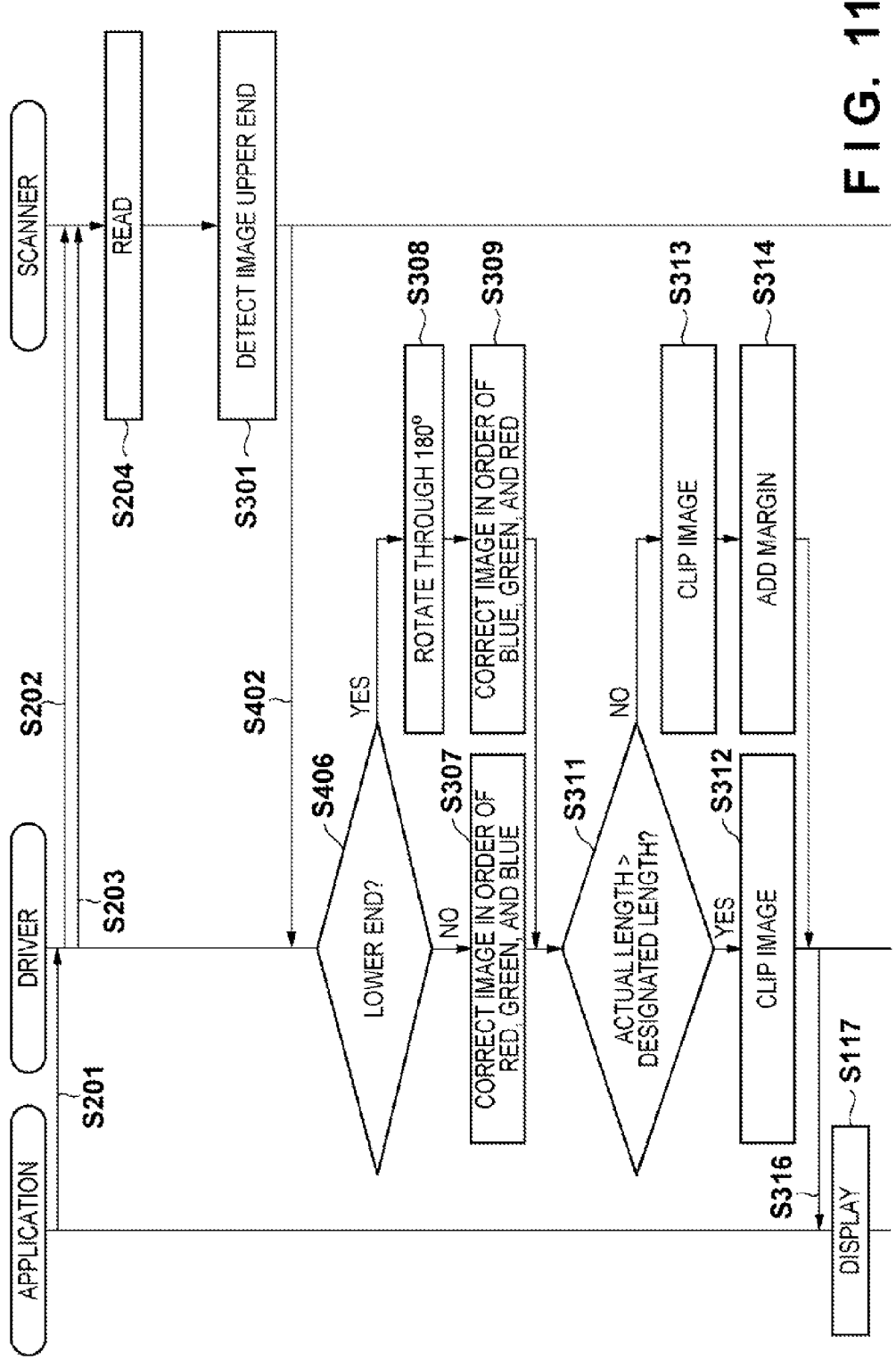
FIG. 11 is a flowchart showing image reading processing according to the fourth embodiment.

FIG. 11 is a flowchart showing image reading processing. After steps S201 to S204 of the second embodiment are executed, step S301 of the third embodiment is executed.

In step S402, an image processing unit 405 transmits an input image and upper end detection result to the driver 502. The upper end detection result is used in image clipping processing in step S312 or S313.

A CPU 417 determines in step S406 according to designation information of a feed direction received from an application 501 whether a source document is fed from the lower or upper end. If the source document is fed from the lower end, the process advances to step S308; if the source document is fed from the upper end, the process advances to step S307. The subsequent processes are common to the second embodiment.

In this way, in the fourth embodiment, the CPU 417 functions as image processing means. Also, the fourth embodiment is a combination of the second and third embodiments, and effects of the forth embodiment are also obtained by combining those of the second and third embodiments.

Fifth Embodiment

The fifth embodiment is a modification of the third embodiment. The fifth embodiment is characterized in that upper end detection processing of a source document is executed by a driver 502.

Figure 12:
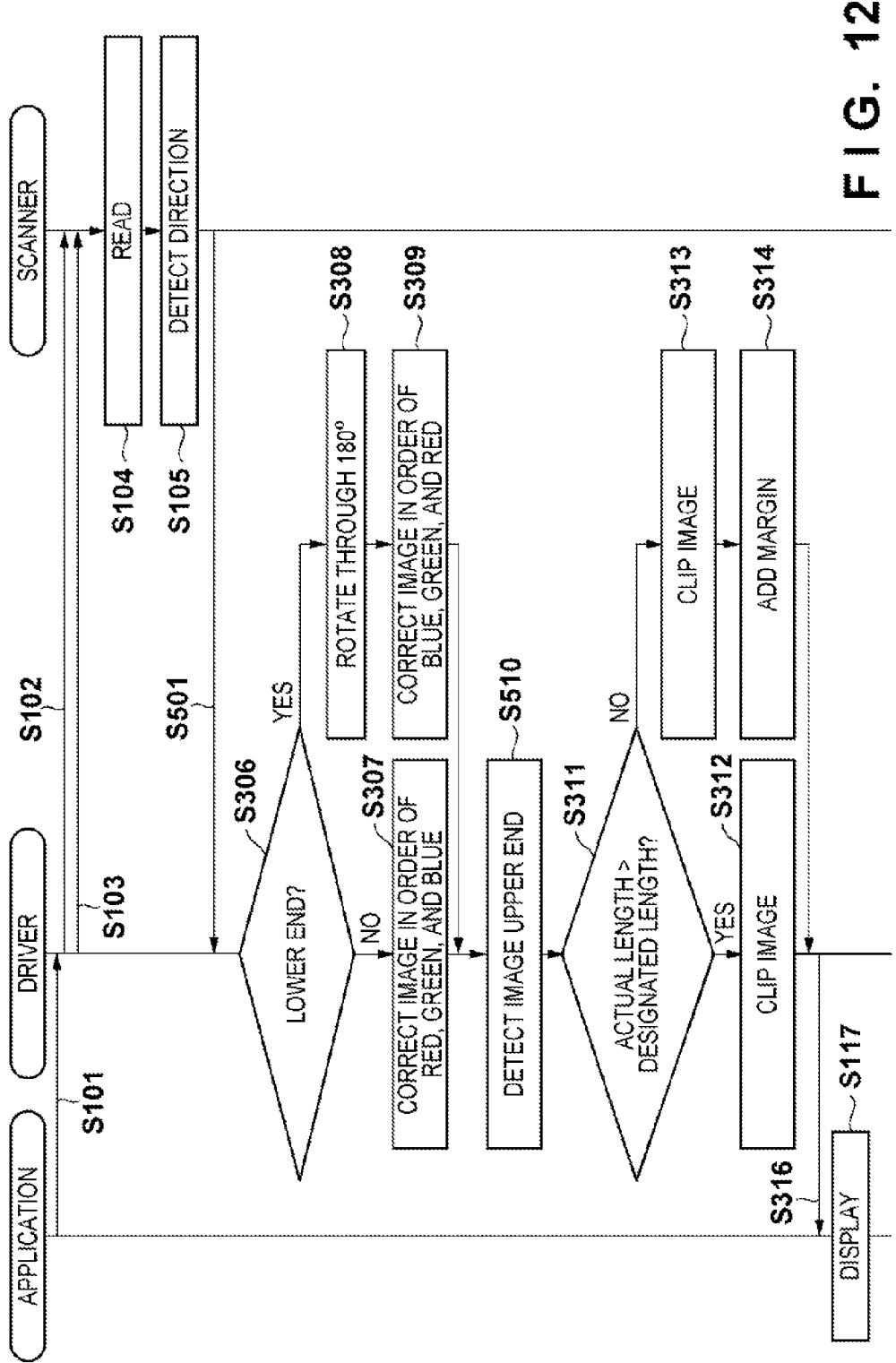
FIG. 12 is a flowchart showing image reading processing according to the fifth embodiment.

FIG. 12 is a flowchart showing image reading processing. After execution of steps S101 to 105, the process advances to step S501. In step S501, an image processing unit 405 transmits an input image and direction detection result to the driver 502.

Furthermore, after execution of steps S306 to S309, the process advances to step S510. In step S510, a CPU 417 detects an upper end of an image from the input image. For example, the CPU 417 detects a shadow of the source document included in the input image as the upper end. After that, steps S311 to S316 are executed.

In the fifth embodiment, since the image upper end detection processing is also executed by a host apparatus 401, the processing load on a scanner 301 can be further reduced compared to the third embodiment. Other effects of the fifth embodiment are common to the third embodiment. As described above, in the fifth embodiment, the CPU 417 functions as an image processing means, image region detection means, and effect image region detection means.

Sixth Embodiment

The sixth embodiment is the invention as a combination of the second and fifth embodiments. That is, the sixth embodiment is the invention in which feed direction designation processing of the second embodiment is added to the fifth embodiment.

Figure 13:
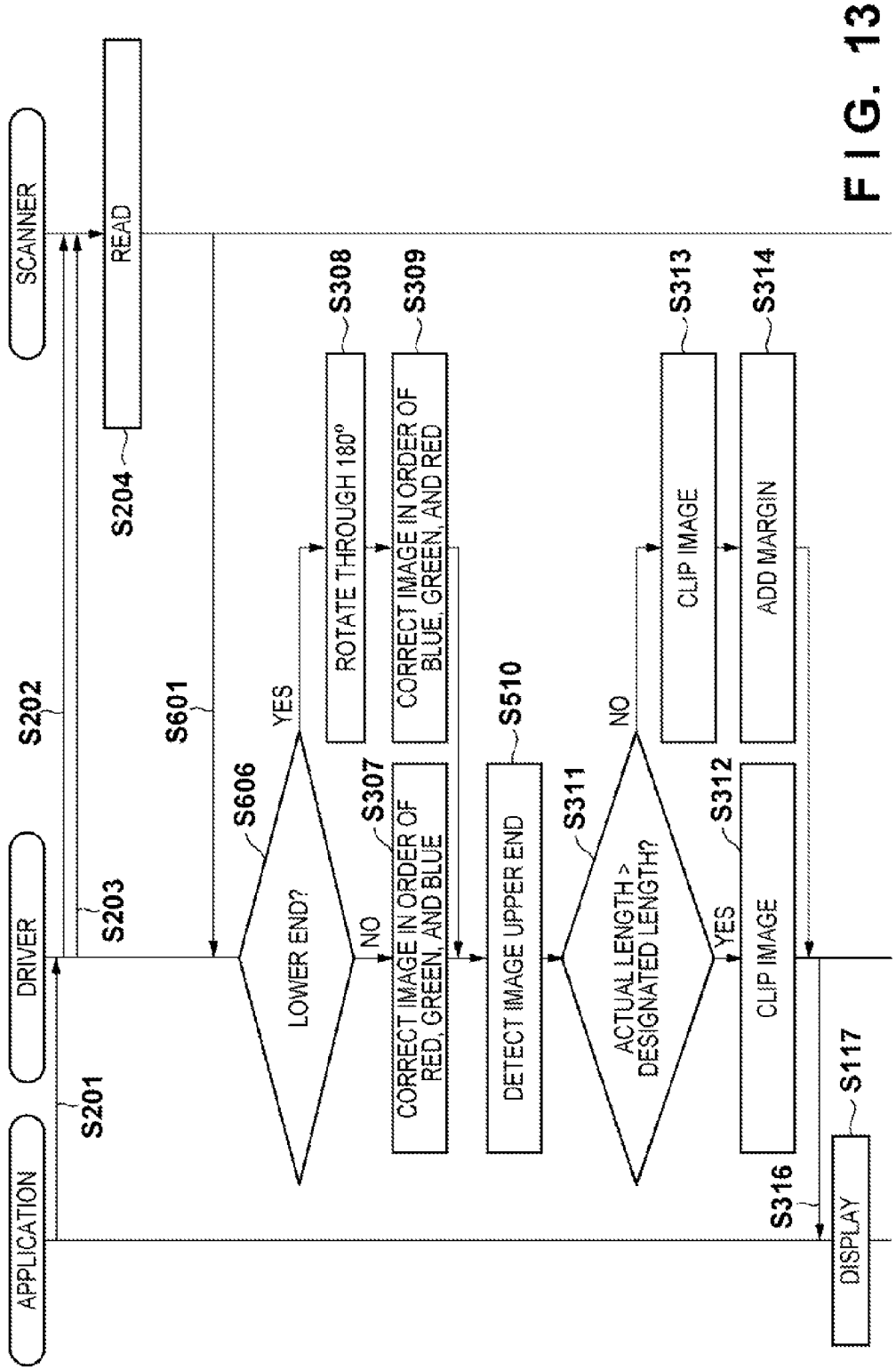
FIG. 13 is a flowchart showing image reading processing according to the sixth embodiment.

FIG. 13 is a flowchart showing image reading processing. After completion of steps S201 to S204, the process advances to step S601. In step S601, an image processing unit 405 transfers an input image to a driver 502 of a host apparatus 401.

A CPU 417 determines in step S606 whether a feed direction designated for an application 501 is that from the lower end. If a source document is fed from the upper end, the process advances to step S307; if the source document is fed from the lower end, the process advances to step S308. The subsequent processes are common to the fifth embodiment.

In this manner, since the sixth embodiment prompts an operator to designate the feed direction, the need for the feed direction detection processing of the host apparatus 401 can be obviated. Other effects of the sixth embodiment are common to the fifth embodiment. In the sixth embodiment, the CPU 417 functions as an image processing means, image region detection means, and effective image region designation means.

Seventh Embodiment

The seventh embodiment is a modification of the third embodiment, and is characterized in that feed direction detection processing executed by a scanner 301 is executed by a driver 502 of a host apparatus 401.

Figure 14:
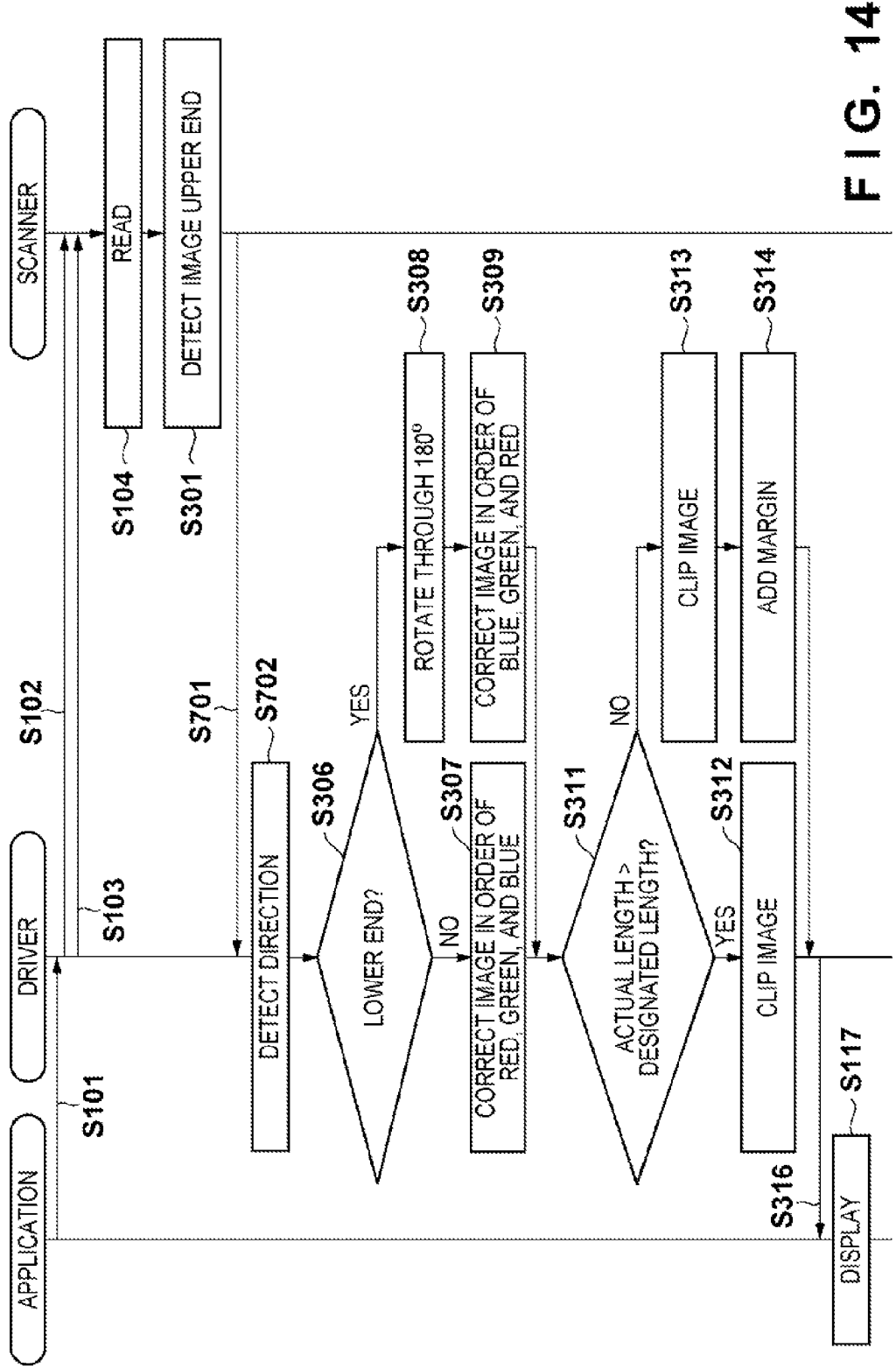
FIG. 14 is a flowchart showing image reading processing according to the seventh embodiment.

FIG. 14 is a flowchart showing image reading processing. Steps S101 to S301 are common to the third embodiment. In step S701, an image processing unit 405 transmits an input image and upper end detection result to the driver 502 of the host apparatus 401.

In step S702, a CPU 417 of the host apparatus 401 executes feed direction detection processing. For example, the CPU 417 applies OCR (Optical Character Recognition) processing to the input image, and stores the number n0 of detected characters in a RAM 418. The CPU 417 rotates the input image through 180°, applies the OCR processing to the rotated image, and stored the number n180 of detected characters in the RAM 418. After that, the CPU 417 further rotates the image through 180°. The CPU 417 compares n0 and n180. If n0≥n180, the CPU 417 determines that a source document is fed from the upper end; if n0<n180, it determines that the source document is fed from the lower end. Note that the OCR processing to be executed in this step need only be known processing. Such feed direction detection processing may be executed in the aforementioned embodiments. After that, steps S306 to S316 are executed.

In this manner, according to the seventh embodiment, since the host apparatus 401 executes the feed direction detection processing, the processing load on the scanner 301 is reduced, thus attaining a manufacturing cost reduction. Other effects of the seventh embodiment are common to the third embodiment. In the seventh embodiment, the CPU 417 functions as an image processing means, effective image region designation means, and direction detection means.

Eighth Embodiment

The eighth embodiment is the invention as a combination of the sixth and seventh embodiments. That is, the eighth embodiment is characterized in that image upper end detection processing of the seventh embodiment is executed by a driver 502 of a host apparatus 401.

Figure 15:
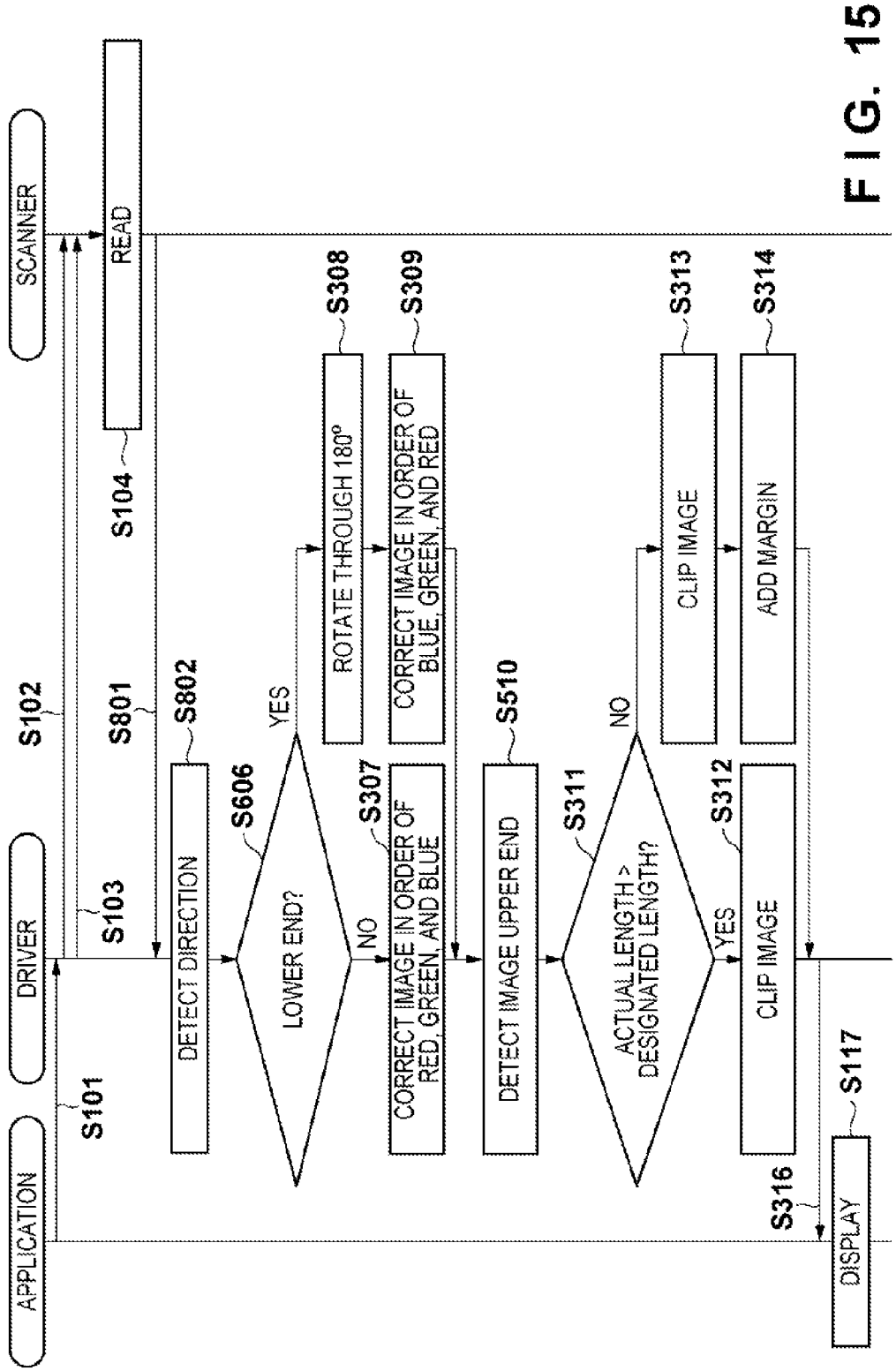
FIG. 15 is a flowchart showing image reading processing according to the eighth embodiment.

FIG. 15 is a flowchart showing image reading processing. Steps S101 to S104 are common to the first and seventh embodiments. In step S801, an image processing unit 405 transmits an input image to the driver 502.

In step S802, a CPU 417 executes direction detection processing. This direction detection processing is common to step S702 of the seventh embodiment. After that, steps S306 to S316 described in the sixth embodiment are executed.

In this way, in the eighth embodiment, since the host apparatus 401 executes the upper end detection processing in addition to the feed direction detection processing, the processing load on the scanner 301 is reduced, thus attaining a manufacturing cost reduction. Other effects of the eighth embodiment are common to the seventh embodiment. In the eighth embodiment, the CPU 417 functions as an image processing means, effective image region designation means, direction detection means, and image region detection means.

[Others]

In the aforementioned embodiments, the length (designated length) of an output image and the feed direction of a source document can be designated via the user interface. Also, a resolution and reading region may be selected via the user interface.

In the above description, one of "10 cm", "20 cm", and "30 cm" can be selected as the designated length. For example, other numerical values (for example, 1 m, an A4 size length, and the like) may be added. Also, a text box used to input a practical numerical value may be added to the user interface.

The aforementioned embodiments are premised on that a source document bundle is set on the image reading apparatus after being rotated through 180°. That is, the aforementioned embodiments are premised on a state in which either the upper or lower end of each source document is directed to the feed port. However, the present invention is applicable to 90°, 270°, and the like as the rotation angles of the source document bundle. That is, the present invention is applicable to a case in which either the right or left end of each source document is directed to the feed port. That is, the present invention is also applicable to a case in which a direction of a read image of a source document is corrected so that an output image of the source document has a predetermined direction. The following description will be given according to the first embodiment. Note that a description about items common to the first embodiment will not be repeated.

When the operator selects a width and length (designated size; a designated length in a widthwise direction and that in a lengthwise direction) of an output image and presses the scan button 603 on the user interface in step S101, the CPU 417 generates an image reading start instruction and transmits that instruction to the driver 502 according to the application 501. The CPU 417 functions as an effective image region designation means for designating an effective image region for an image. After that, steps S103 and S104 are executed.

In step S105, the image processing unit 405 executes direction detection processing. The image processing unit 405 functions as a direction detection means for detecting a visual direction of an image. The image processing unit 405 determines in step S106 from which of the upper, lower, right, and left ends a source document is read. This determination method is as has already been described above. For example, the image processing unit 405 rotates a source document image clockwise through four angles, that is, 0°, 90°, 180°, and 270°, executes character recognition for respective rotated images, and adopts a rotation angle corresponding to the highest recognition rate. Note that 0°, 90°, 180°, and 270° respectively correspond to the upper, right, lower, and left ends. When the source document is read from the upper or lower end, the same processing as in the first embodiment is executed.

On the other hand, if the image processing unit 405 determines that the source document is read from the right or left end, steps S107 to S109 are replaced by the following processes. Initially, the image processing unit 405 executes image correction processing based on the lighting order of the light sources of the line image sensor. Since this image process is applied to an image before rotation, correction processing is executed according to the lighting order (in an order of red⇒ green⇒ blue). If the image processing unit 405 determines that the source document is read from the right end, it rotates the image clockwise through 90° as a predetermined angle. If the image processing unit 405 determines that the source document is read from the left end, it rotates the image counterclockwise through 90° as a predetermined angle. The image processing unit 405 detects positions of the upper end, left end, and right end of a specific region of the image. That is, the positions of the upper side, left side, and right side of the four sides of the source document image included in the entire read image are detected. The detection method of the upper side, left side, and right side can be a general method. For example, a method of detecting a shadow of a source document from an image or the like can be adopted. In this way, the image processing unit 405 functions as an image region detection means for detecting the header of a specific region of an image.

Next, using the same methods as in steps S111, S112, S113, and S114, the image processing unit 405 clips an image and adds a margin. Furthermore, the image processing unit 405 clips an image and adds a margin in the widthwise direction of the image based on the designated length (designated width) in the widthwise direction of the image. For example, when the width of a specific region is smaller than the designated width designated via the user interface, the image processing unit 405 clips an image on the left side of the left end of the specific region and that on the right side of the right end of the image from the image, and adds a margin corresponding to a length ½ of a difference between the designated width and the width of the specific region to the left and right sides of the image. When the width of the specific region is larger than the designated width, the image processing unit 405 clips an image of the designated width from the specific region. In this manner, the image processing unit 405 functions as an image processing means for, when the direction of an image agrees with a first direction, outputting an effective image region with reference to the header of a specific region detected by image region detection means as an output image, and for, when the direction of the image agrees with a second direction, rotating the image through the predetermined angle, and outputting an effective image region with reference to the header of a specific region detected by an image region detection means as an output image. After that, in the same manner as in steps S115, S116, and S117, the image is transferred and displayed.

As described above, the present invention allows to obtain an output image with high visibility for the user even when a direction of a source document bundle with respect to the feed port is any of the upper, lower, right, and left end directions. Of course, even when the designated size and actual size do not match, the workload on the part of the user required to align upper and lower directions of source documents can be reduced.

The present invention is not limited to the aforementioned embodiments, and various changes and modification can be made without departing from the sprit and scope of the present invention. Therefore, the following claims are appended to disclose the scope of the present invention.

What is claimed is:

1. An image processing apparatus comprising:
    a separation unit configured to separate a plurality of source documents and to convey each separated source document in a conveyance direction one by one;
    an image read unit configured to read an image of a source document conveyed by the separation unit; and
    one or more processors configured to cause execution of processes which include:
    direction detection to detect whether a direction of the image is a visually upper direction or lower direction;
    image region detection to detect a specific region of the image after the direction of the image is detected based on a detection result of the direction detection;
    effective image region designation to designate an effective image region for the image at a size set by a user;
    effective image region output to output the effective image region designated by the effective image region designation as an output image with reference to a header of the specific region detected by said image region detection; and
    length comparison to compare a length in the conveyance direction of the specific region of the image with a length in the conveyance direction of the effective image region for the image at the size set by the user,
    wherein responsive to a comparing result where the length of the specific region of the image is longer than the length of the effective image region for the image at the size set by the user, the image is rotated by 180° such that the direction of the image becomes the upper direction, and the effective image region is output as the output image with reference to the header of the specific region detected by the image region detection from the 180° rotated image, the effective image region being outputted as the output image by automatically clipping at the size of the effective image region; and
    wherein responsive to a comparing result where the length of the specific region of the image is not longer than the length of the effective image region for the image at the size set by the user, the effective image region is output automatically added with a margin as the output image at the size of the effective image region with reference to the header of the specific region detected by said image region detection from the 180° rotated image.

2. The image processing apparatus according to claim 1, wherein the effective image region is a region defined by a length in an up-and-down direction of the output image.

3. The image processing apparatus according to claim 1, wherein said image region detection is further configured for detection of an upper end of a source document as the header of the specific region.

4. The image processing apparatus according to claim 1, wherein said image region detection is further configured for detection of a header of a source document region of the image as the header of the specific region.

5. The image processing apparatus according to claim 1, wherein said image region detection is further configured for detection of an upper end of the image as the header of the specific region.

6. The image processing apparatus according to claim 1, wherein said direction detection is further configured for recognition of characters included in the image, and for a determination based on directions or a recognition rate of the recognized characters of whether the direction of the image is the visually upper direction or the visually lower direction.

7. The image processing apparatus according to claim 1, wherein said image read unit is an image reading unit configured to receive a separated plurality of source documents from the separation unit one by one, and to read an image on the each separated source document.

8. The image processing apparatus according to claim 1, wherein said image read unit is a reception unit configured to receive an image transmitted from an image reading apparatus which separates and feeds a plurality of source documents one by one, and which read an image on each fed source document.

9. The image processing apparatus according to claim 1, wherein said direction detection is further configured for recognition of positions of punch holes formed in the source document, and for a determination based on the positions of the punch holes whether the direction of the image is the visually upper direction or the visually lower direction.

10. An image processing method comprising:
    a separation step of separating a plurality of source documents and conveying each separated source document in a conveyance direction one by one;
    an image read step of reading an image of a conveyed source document;
    a direction detection step of detecting whether a direction of the image is a visually upper direction or lower direction;
    an image region detection step of detecting a specific region of the image after the direction of the image is detected based on a detection result of the direction detection step;
    an effective image region designation step of designating an effective image region for the image at a size set by a user;
    an image processing step of outputting the effective image region designated in the effective image region designation step as an output image with reference to a header of the specific region detected in the image region detection step; and
    a comparing step of comparing a length in the conveyance direction of the specific region of the image with a length in the conveyance direction of the effective image region for the image at the size set by the user;
    wherein responsive to a comparing result where the length of the specific region of the image is longer than the length of the effective image region for the image at the size set by the user, the image processing step includes rotating the image by 180° such that the direction of the image becomes the upper direction, and outputting the effective image region as the output image with reference to the header of the specific region detected in the image region detection step from the 180° rotated image, the effective image region being outputted as the output image by automatically clipping at the size of the effective image region; and wherein responsive to a comparing result where the length of the specific region of the image is not longer than the length of the effective image region for the image at the size set by the user, the image processing step includes outputting the effective image region automatically added with a margin as the output image at the size of the effective image region with reference to the header of the specific region detected in the image region detection step from the 180° rotated image.

11. A computer program stored in a non-transitory computer readable storage medium, controlling a computer to execute:

a separation step of separating a plurality of source documents and conveying each separated source document in a conveyance direction one by one;

an image read step of reading an image of a conveyed source document;

a direction detection step of detecting whether a direction of the image is a visually upper direction or lower direction;

an image region detection step of detecting a specific region of the image after the direction of the image is detected based on a detection result of the direction detection step;

an effective image region designation step of designating an effective image region for the image at a size set by a user;

an image processing step of outputting the effective image region designated in the effective image region designation step as an output image with reference to a header of the specific region detected in the image region detection step; and a comparing step of comparing a length in the conveyance direction of the specific region of the image with a length in the conveyance direction of the effective image region for the image at the size set by the user;

wherein responsive to a comparing result where the length of the specific region of the image is longer than the length of the effective image region for the image at the size set by the user, the image processing step includes rotating the image by 180° such that the direction of the image becomes the upper direction, and outputting the effective image region as the output image with reference to the header of the specific region detected in the image region detection step from the 180° rotated image, the effective image region being outputted as the output image by automatically clipping at the size of the effective image region; and wherein responsive to a comparing result where the length of the specific region of the image is not longer than the length of the effective image region for the image at the size set by the user, the image processing step includes outputting the effective image region automatically added with a margin as the output image at the size of the effective image region with reference to the header of the specific region detected in the image region detection step from the 180° rotated image.

12. An image processing system comprising:

a separation unit configured to separate a plurality of source documents and to convey each separated source document in a conveyance direction one by one;

an image scanner configured to read an image of a source document conveyed by the separation unit; and a host computer configured to communicate with the image scanner, wherein one of the image scanner and the host computer further includes at least one processor configured to cause execution of processes which include:

direction detection to detect whether a direction of the image is a visually upper direction or lower direction;

image region detection to detect a specific region of the image after the direction of the image is detected based on a detection result of the direction detection;

effective image region designation to designate an effective image region for the image at a size set by a user;

effective image region output to output the effective image region designated by the effective image region designation as an output image with reference to a header of the specific region detected by said image region detection; and length comparison to compare a length in the conveyance direction of the specific region of the image with a length in the conveyance direction of the effective image region for the image at the size set by the user, wherein responsive to a comparing result where the length of the specific region of the image is longer than the length of the effective image region for the image at the size set by the user, the image is rotated by 180° such that the direction of the image becomes the upper direction, and the effective image region is output as the output image with reference to the header of the specific region detected by the image region detection from the 180° rotated image, the effective image region being outputted as the output image by automatically clipping at the size of the effective image region; and wherein responsive to a comparing result where the length of the specific region of the image is not longer than the length of the effective image region for the image at the size set by the user, the effective image region is outputted automatically added with a margin as the output image at the size of the effective image region with reference to the header of the specific region detected by said image region detection from the 180° rotated image.

13. An image processing apparatus comprising:

a separation unit configured to separate a plurality of source documents and to convey each separated source document in a conveyance direction one by one;

an image read unit configured to read an image of a source document conveyed by the separation unit;

an accepting unit configured to accept information input by a user on whether a direction of the image read by the image read unit is a visually upper direction or lower direction; and one or more processors configured to cause execution of processes which include:

image region detection to detect a specific region of the image after the direction of the image is accepted based on an acceptance result of the accepting unit;

effective image region designation to designate an effective image region for the image at a size set by a user;

effective image region output to output the effective image region designated by the effective image region designation as an output image with reference to a header of the specific region detected by said image region detection; and length comparison to compare a length in the conveyance direction of the specific region of the image with a length in the conveyance direction of the effective image region for the image at the size set by the user, wherein responsive to a comparing result where the length of the specific region of the image is longer than the length of the effective image region for the image at the size set by the user, the image is rotated by 180° such that the direction of the image becomes the upper direction, and the effective image region is outputted as the output image with reference to the header of the specific region detected by the image region detection from the 180° rotated image, the effective image region being outputted as the output image by automatically clipping at the size of the effective image region; and wherein responsive to a comparing result where the length of the specific region of the image is not longer than the length of the effective image region for the image at the size set by the user, the effective image region is output automatically added with a margin as the output image at the size of the effective image region with reference to the header of the specific region detected by said image region detection from the 180° rotated image.

\* \* \* \* \*